United States Patent [19]

Riehl et al.

[11] Patent Number: 4,764,250
[45] Date of Patent: Aug. 16, 1988

[54] VACUUM EVAPORATOR

[76] Inventors: Günther Riehl, Am Kohlenschacht 22 b, D-8403 Bad Abbach; Günther Vollgold, Veit-Stoss-Strasse 10, D-8540 Schwabach, both of Fed. Rep. of Germany

[21] Appl. No.: 912,240
[22] PCT Filed: Nov. 22, 1985
[86] PCT No.: PCT/EP85/00639
§ 371 Date: Oct. 8, 1986
§ 102(e) Date: Oct. 8, 1986
[87] PCT Pub. No.: WO86/03684
PCT Pub. Date: Jul. 3, 1986

[30] Foreign Application Priority Data

Dec. 24, 1984 [DE] Fed. Rep. of Germany ....... 3447433
Dec. 24, 1984 [DE] Fed. Rep. of Germany ....... 3447435

[51] Int. Cl.$^4$ .......................... B01D 3/10; B01D 3/42
[52] U.S. Cl. .......................... 159/6.1; 159/DIG. 16; 159/DIG. 41; 202/205; 202/238; 202/266; 203/1; 203/91; 203/DIG. 18
[58] Field of Search ............... 202/205, 238, 266, 160, 202/206; 203/91, 1, 2, DIG. 18; 159/DIG. 16, DIG. 41, 26.2, 6.1; 196/112, 114, 132; 165/86

[56] References Cited

U.S. PATENT DOCUMENTS

| 2,575,688 | 11/1951 | Smith | 202/238 |
| 2,695,871 | 11/1954 | Shavel, Jr. et al. | 202/205 |
| 3,219,099 | 11/1965 | Hamlow et al. | 202/238 |
| 3,342,696 | 9/1967 | Bush | 202/238 |
| 4,390,500 | 6/1983 | Miskinis | 202/238 |
| 4,569,724 | 2/1986 | Firestone | 202/238 |
| 4,622,102 | 11/1986 | Diebel | 202/266 |

FOREIGN PATENT DOCUMENTS

| 0156937 | 10/1985 | European Pat. Off. | 159/DIG. 16 |
| 2700894 | 7/1978 | Fed. Rep. of Germany | 202/238 |
| 2161309 | 6/1973 | France | 202/238 |
| 2129321 | 5/1984 | United Kingdom | 159/DIG. 16 |
| 2146542 | 4/1985 | United Kingdom | |

OTHER PUBLICATIONS

Lapedes, "McGraw Hill Dictionary of Scientific and Technical Terms," 2nd ed. p. 106.

Primary Examiner—David L. Lacey
Assistant Examiner—V. Manoharan
Attorney, Agent, or Firm—Collard, Roe & Galgano

[57] ABSTRACT

A vacuum evaporator is provided which is connected to the casing of a driving motor for rotating the evaporator piston, wherein the driving motor is vertically adjustable mounted on a bolt fixedly mounted on a pedestal. A supporting sleeve which is freely displaceable on the bolt supports the driving motor thereon and a lever arm supports this sleeve and is articulated on the pedestal. A thread drive is coupled to the lever arm by means of a coupling sleeve arranged on the lever arm and wherein the lever arm is pivotable by the thread drive and the thread drive is adjustable by means of a geared motor.

9 Claims, 3 Drawing Sheets

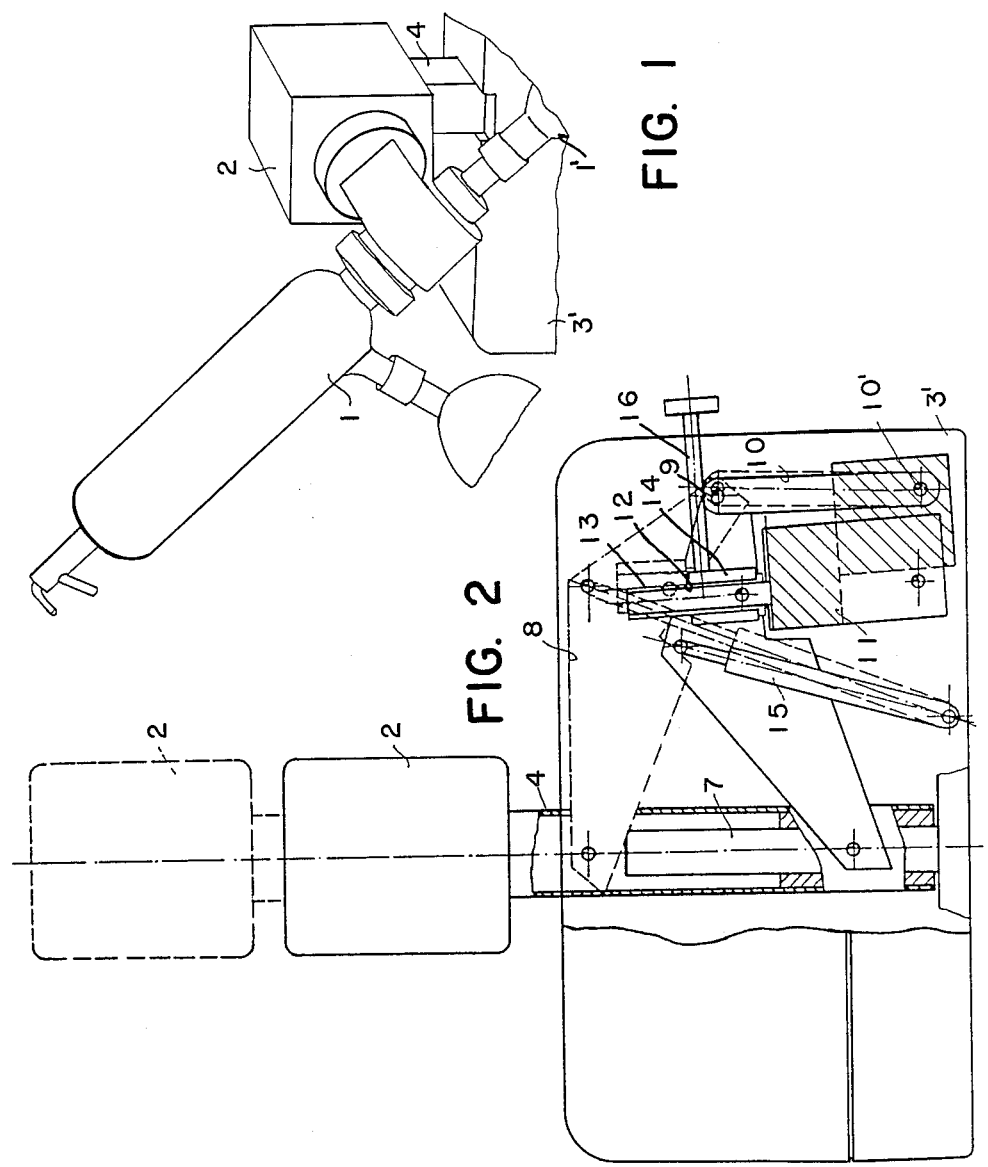

VACUUM EVAPORATOR

The invention relates to a vacuum evaporator which is supported with vertical adjustability on a base plate or pedestal by means of a holding device.

It is known that in many instances, vacuum evaporators are mounted above the water bath serving as the heat source with the help of stands. The vacuum evaporator can be vertically adjusted on such stands by manual manipulation. However, it has been found that the change in height so accomplished requires a great deal of work, and that such changes cannot be automated. Furthermore, methods are known by which vacuum evaporators are supported by a threaded spindle, in particular by a motor-driven threaded spindle which is guided in a straight line, and vertically adjusted by rotating the threaded spindle. However, such threaded spindle cannot support vacuum evaporators in any stable manner.

The objective of the invention is to make provision for measures for mounting vacuum evaporators in a stable manner that permits height adjustments and automation.

According to the invention, this objective is accomplished in that the vacuum evaporator is fixed on a supporting sleeve which is vertically guided on a bolt rigidly connected with the pedestal being supported by the free end of a lever arm pivoted on the pedestal. The lever arm swings in the vertical plane between two end positions with the help of a motor-driven threaded shaft which is tilt-mounted on the pedestal and rotating in a threaded sleeve that is connected with the lever arm. By means of such supporting sleeve, a stable and steady support of the vacuum evaporator is achieved on all levels and the lever arm permits exactly defined adjustments. If need be, the adjustment motions performed by means of the lever arm may be derived from a parameter such as, for example, the vacuum. Furthermore, the mounting support for the vacuum evaporator can be automated and the articulated connection between the lever arm and pedestal formed by a lashing pivoted on such lever arm and pedestal keeps the supporting sleeve and vacuum evaporator free from interfering transverse forces.

According to a preferred embodiment, the driven shaft of a geared motor is used as the threaded shaft, such geared motor being tilt-mounted on the pedestal.

For the purpose of actuating the lever arm independently of the drive, for example for lifting the evaporator piston from the water bath in the event of a power failure, provision is made for the threaded sleeve to be surrounded by and freely displaceable in a coupling sleeve that is rigidly connected with the lever arm, and that these two sleeves can be connected or separated by means of a set screw guided in the coupling sleeve. When the coupling sleeve and the threaded sleeve are firmly connected, the lever arm follows the motions of the threaded shaft, whereas when the set screw is loosened, the coupling sleeve with the lever arm can perform motions relative to the threaded sleeve. Furthermore, the coupling sleeve is provided with a transversely displaceable pin, which, in the ON-position, closes an electric switching element in the current circuit of the geared motor, and opens it when the coupling sleeve is in the OFF-position.

It has been found that it is particularly advantageous if a damping spring is arranged between the lever arm and pedestal. Apart from affording weight relief, such damping spring, when the coupling sleeve and the threaded sleeve are separated, affords the advantage that that the lift-off motions of the lever arm can be effected automatically under the influence of the initial tension of the damping spring.

Finally, for the purpose of securing the motions of the lever arm, provision is made that the top and bottom end positions are fixed by limit switches projecting into the path of swivel of the lever arm and disposed in the current circuit of the geared motor.

Furthermore, in devices in which power cables for the driving motor of the evaporator piston are installed in the supporting sleeve, the vacuum evaporator may be supported by a geared motor being detachably pivoted on the supporting sleeve, and electrical connecting means such as pin jacks and sockets may be provided on the plane of connection between the driving motor and supporting sleeve. The possibility of electric disconnection of the driving motor and power cable permits the driving motor and the vacuum evaporator to be either detached from the supporting sleeve or assembled thereon.

Furthermore, measures are provided by which any desired number of predetermined evaporation programs for vacuum evaporators can be kept available for retrieval as required. By such measures, the operating data can be stored in an electronic microprocessor memory via an input code and keyboard, and such data can be retrieved via an output code and keyboard. In this way, as many evaporation procedures as desired can be kept available and selectively recalled individually. Furthermore, such evaporation procedures are available in a reproducible manner, which makes it simpler to operate the device and affords automatic evaporation operations.

BRIEF DESCRIPTION OF THE DRAWING(S)

The invention is shown in the drawing with the help of an embodiment. In the drawing, FIG. 1 is a schematic view of a vacuum evaporator showing part of a mounting device;

FIG. 2 shows a front view of a mounting device partly shown by a sectional view;

Figure 3:
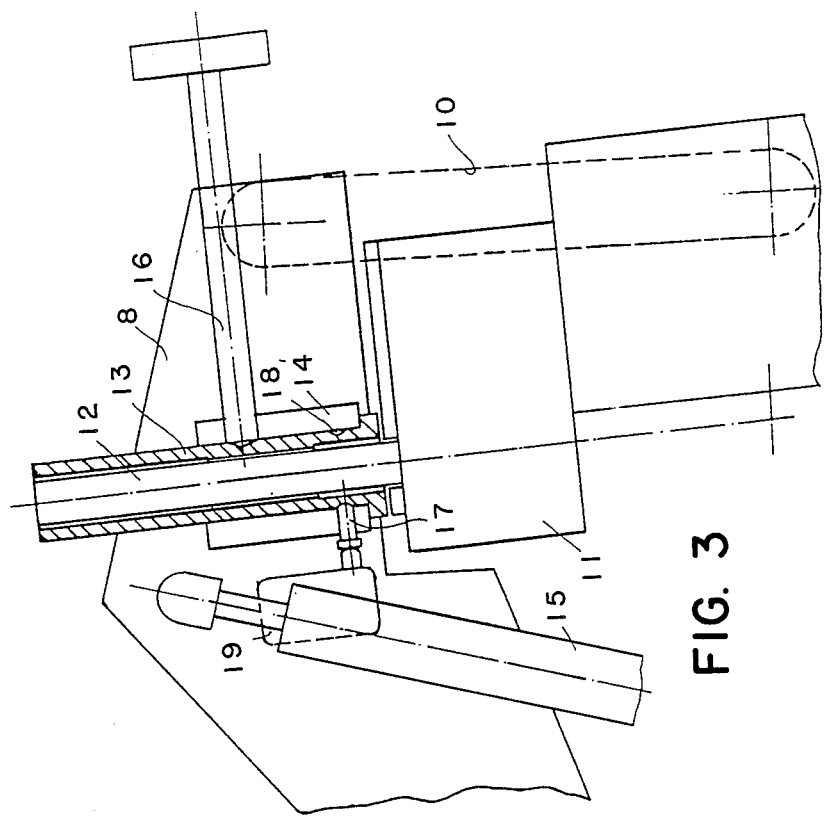
FIG. 3 is a part-sectioned view of a mounting device.
Figure 4:
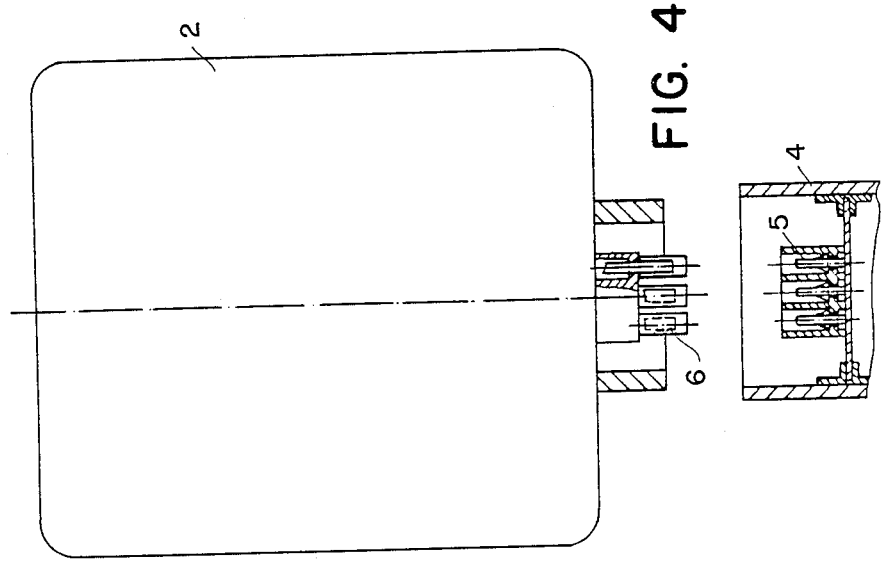
FIG. 4 shows a sectional view of a supporting sleeve with a plug-in driving motor.

In the figures, reference numeral 1 denotes a vacuum evaporator of the type known per se, such evaporator having an evaporator piston 1' which is rotatable by means of a driving motor 2. The evaporator piston 1', in a manner known per se, can be immersed more or less deeply in a water bath (not shown) mounted on the pedestal 3'. For this purpose, the vacuum evaporator 1 is rigidly connected with the casing of the driving motor 2. Such driving motor 2 is rigidly mounted on the supporting sleeve 4, or detachably mounted as shown in FIG. 4. In the embodiment with the detachable connection, the pin jacks 5 and sockets 6 serving as electrical connectors are provided on the common plane of separation of the driving motor and supporting sleeve. The power cables (not shown) leading to the pin jacks 5 extend through the supporting sleeve 4, which is displaceable on a bolt 7, the latter being rigidly connected with the pedestal, and supported on such bolt in such a way that its level can be vertically adjusted by means of a swivelling lever arm 8. At point 9, such lever arm 8 is pivoted on a supporting lashing 10 which, at point 10', is swing-connected with the pedestal 3'. A geared motor 11 is provided for automatically swinging the lever arm 8. The driven shaft of such geared motor is provided in the form of a threaded shaft 12, which is engaged with a threaded sleeve 13, the latter being connected with the lever arm 8 by way of a coupling sleeve 14 and a set screw 16. Furthermore, a damping spring 15, for example a gas pressure spring, is clamped between the lever arm 8 and the pedestal 3'. Initially, the prestressed tension of such damping spring contributed to a weight relief. By rotation of the threaded shaft 12, the threaded sleeve 13 and the coupling sleeve 14 are displaced, which causes the lever arm 8 to vertically lift or lower the supporting sleeve 4 for the vacuum evaporator 1. By greater or lesser rotation of the threaded shaft 12, the vacuum evaporator, with the aid of the driving motor 11, is capable of assuming exact positions in height, in which it can be supported when the threaded shaft 12 is resting. This affords the user the possibility to immerse the evaporator piston 1' to a greater or lesser depth in an associated water bath for the purpose of feeding more or less heat, respectively. For the actuation of the lever arm 8 in the event of power failure, the coupling sleeve 14 can be separated from the threaded sleeve 13 by loosening the set screw 16, and the lever arm is lifted or can be lifted into the position shown in FIG. 2 by the dashed line, preferably under the influence of the damping spring 15. Such position is shown by way of example. The coupling sleeve 14 displaceably accommodates a pin 17, which, when the threaded sleeve 13 and the coupling sleeve 14 are in their coupled positions, is arrested in an annular groove 18 of the threaded sleeve 13, and switches on the switch 19. During relative motions of the coupling sleeve 14 on the threaded sleeve 13, the pin 17 is lifted from the annular groove 18 and the switch 19 for disconnecting the geared motor 11 from the current source is switched off. Of course, the lever arm 8 may have any desired length. Upper limit switch 25 and lower limit switch 26, as clearly seen in FIG. 2, disconnect the electrical current to geared motor 11 when lever 8 reaches its upper and lower limits, respectively.

Figure 5:
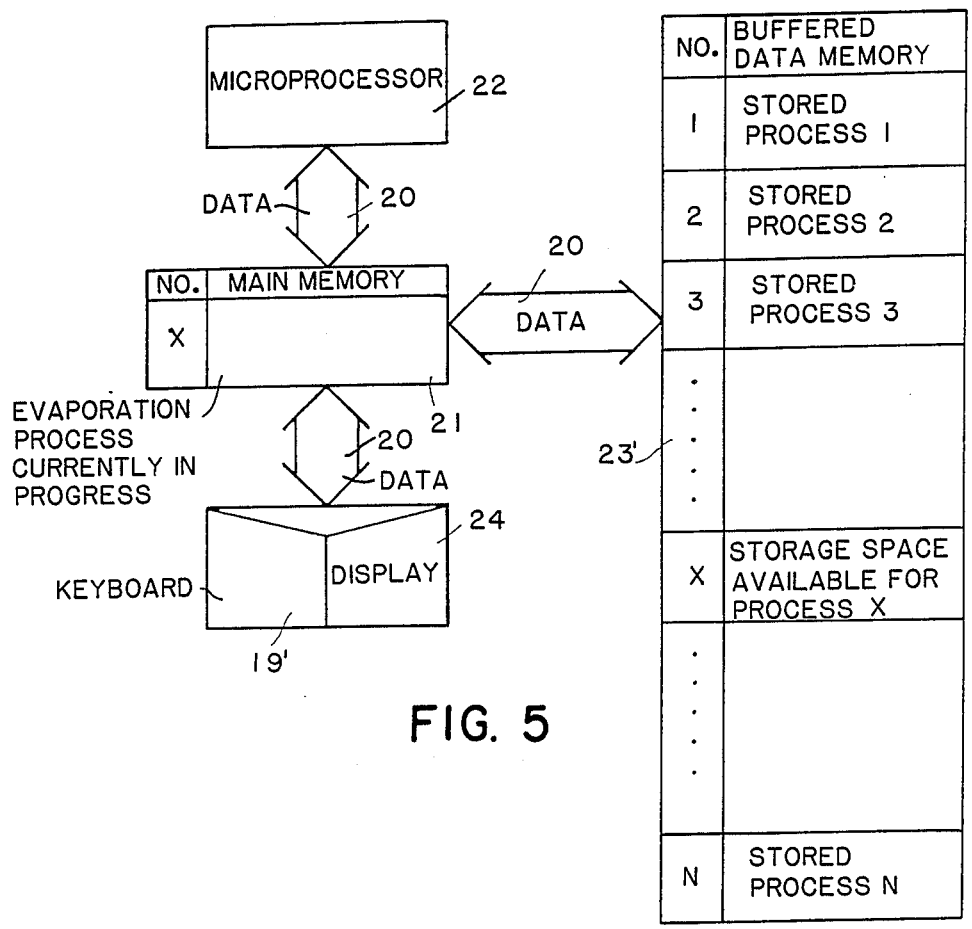
FIG. 5 shows an evaporation process data storage for a vacuum evaporator.

As shown in FIG. 5, when the vacuum evaporator is in operation, a number of input codes for evaporation process data 20, in particular for vacuum parameters, boiling temperatures, speed of the evaporator piston and heating bath temperatures can be input by means of a keyboard 19' for storage in a main memory 21 with a microprocessor 22, and stored at 23'. Reference numeral 24 denotes a display terminal. The stored evaporation procedures may be retrieved on the keyboard 19' with the aid of output codes relating to predetermined evaporation procedures. In this connection, the essential feature of the invention is the possibility of data storage.

We claim:

1. In a vacuum evaporator connected to the casing of a driving motor for rotating an evaporator piston, said motor being vertically adjustably mounted on a pedestal, the improvement comprising:
   (a) a vertically arranged bolt fixedly mounted on said pedestal;
   (b) a supporting sleeve movably mounted on said bolt and supporting said driving motor;
   (c) a lever arm supporting said supporting sleeve and connected to said pedestal by an articulated structure; and
   (d) a thread drive coupled to said lever arm by means of a coupling sleeve arranged on the lever arm, said lever arm being pivotally movable by said thread drive, and said thread drive being adjustably driven by a geared motor.

2. The vacuum evaporator according to claim 1, wherein said thread drive comprises a threaded sleeve coupled with said coupling sleeve, and a threaded shaft threadably engaged with said threaded sleeve and rotatable by said geared motor.

3. The vacuum evaporator according to claim 1, wherein said geared motor is tiltingly arranged on the pedestal.

4. The vacuum evaporator according to claim 1, wherein said articulated structure comprises a support lashing pivotally connected to said lever arm, said lashing being pivotally mounted to said pedestal.

5. The vacuum evaporator according to claim 1, which further comprises a damping spring clamped between the lever arm and the pedestal.

6. The vacuum evaporator according to claim 2, wherein said coupling sleeve and said threaded sleeve are connected by means of a set screw guided in said coupling sleeve.

7. The vacuum evaporator according to claim 6, wherein said coupling sleeve has a transversely displaceable pin which actuates an electrical switching element for the geared motor when said coupling sleeve and said threaded sleeve are connected, and releases said element when said coupling sleeve and said threaded sleeve are separated.

8. The vacuum evaporator according to claim 1, which further comprises limit switches projecting into the path of swivel of said lever arm so as to determine the top and bottom end positions of said lever arm, said switches being connected to said geared motor so as to control the operation of said geared motor.

9. The vacuum evaporator according to claim 1, wherein electrical pin jacks and sockets are arranged on the plane of connection of the driving motor and the supporting sleeve so as to connect said driving motor to said supporting sleeve.

* * * * *